US012711477B2

(12) United States Patent
Christensen

(10) Patent No.: US 12,711,477 B2
(45) **Date of Patent: *Aug. 18, 2026**

(54) SYSTEMS AND METHODS FOR EMPLOYER DIRECT ELECTRONIC PAYMENT

(71) Applicant: Worldpay, LLC, Symmes Township, OH (US)

(72) Inventor: Coy Christensen, Scottsdale, AZ (US)

(73) Assignee: Worldpay, LLC, Symmes Township, OH (US)

( * ) Notice: Subject to any disclaimer, the term of this patent is extended or adjusted under 35 U.S.C. 154(b) by 328 days.

This patent is subject to a terminal disclaimer.

(21) Appl. No.: 18/482,432

(22) Filed: Oct. 6, 2023

(65) Prior Publication Data

US 2024/0037523 A1 Feb. 1, 2024

Related U.S. Application Data

(63) Continuation of application No. 17/333,871, filed on May 28, 2021, now Pat. No. 11,816,646, which is a (Continued)

(51) Int. Cl.
*G06Q 20/10* (2012.01)
*G06Q 20/20* (2012.01)
(Continued)

(52) U.S. Cl.
CPC ......... *G06Q 20/105* (2013.01); *G06Q 20/202* (2013.01); *G06Q 20/24* (2013.01); (Continued)

(58) Field of Classification Search
CPC .. G06Q 20/105; G06Q 40/125; G06Q 20/202; G06Q 20/24; G06Q 20/341; G06Q 20/409
See application file for complete search history.

(56) References Cited

U.S. PATENT DOCUMENTS

| | | | |
|---|---|---|---|
| 6,473,500 | B1 | 10/2002 | Risafi et al. |
| 7,720,755 | B1 | 5/2010 | Coyle |

(Continued)

OTHER PUBLICATIONS

"An Employer's Guide to Payroll Cards". Retrieved from . 2014. (Year: 2014).

(Continued)

*Primary Examiner* — Nathan A Mitchell
(74) *Attorney, Agent, or Firm* — Bookoff McAndrews, PLLC

(57) ABSTRACT

A method for conducting payment transaction by an employee using an employer payment system includes retrieving a token or an account identification from the employee payment card presented by a consumer, sending an authorization request with token, account identification and transaction data to an acquirer processor, identifying the employer and the employee associated with the token or account identification, determining whether the employee is authorized for the requested transaction based on an employee information from the employer's database, sending, to the employer, a transaction request from the point of sale terminal, transferring funds electronically from the employee's funds account or employer's account to the merchant in accordance with the transaction request between the merchant and the employee, and updating the employer's database with the transaction information once the transfer of funds is completed.

20 Claims, 4 Drawing Sheets

Related U.S. Application Data continuation of application No. 15/856,737, filed on Dec. 28, 2017, now Pat. No. 11,055,678.

(51) Int. Cl.

*G06Q 20/24* (2012.01)
*G06Q 20/34* (2012.01)
*G06Q 20/40* (2012.01)
*G06Q 40/12* (2023.01)

(52) U.S. Cl.

CPC ......... *G06Q 20/341* (2013.01); *G06Q 20/409* (2013.01); *G06Q 40/125* (2013.12)

(56) References Cited

U.S. PATENT DOCUMENTS

| | | | | |
|---|---|---|---|---|
| 8,015,085 | B2 | 9/2011 | Blagg et al. | |
| 9,418,387 | B1 * | 8/2016 | Aaron | G06Q 20/10 |
| 9,530,131 | B2 * | 12/2016 | Patterson | G06Q 20/401 |
| 9,922,371 | B1 | 3/2018 | Bailey | |
| 10,339,608 | B1 | 7/2019 | Haitz et al. | |
| 10,679,303 | B1 | 6/2020 | Aaron et al. | |
| 2003/0053609 | A1 | 3/2003 | Risafi et al. | |
| 2003/0061162 | A1 | 3/2003 | Matthews | |
| 2003/0065618 | A1 * | 4/2003 | VanDeBoe, Jr. | G06Q 20/102 705/40 |
| 2003/0074311 | A1 | 4/2003 | Saylors et al. | |
| 2005/0177496 | A1 | 8/2005 | Blagg et al. | |
| 2005/0205662 | A1 * | 9/2005 | Nelson | G06Q 40/00 235/380 |
| 2006/0190332 | A1 | 8/2006 | Grider | |
| 2007/0124224 | A1 | 5/2007 | Ayers et al. | |
| 2008/0114658 | A1 | 5/2008 | Weitzman | |
| 2008/0195541 | A1 | 8/2008 | Battaglini et al. | |
| 2008/0306844 | A1 * | 12/2008 | Jackman | G06Q 20/10 705/30 |
| 2010/0010901 | A1 * | 1/2010 | Marshall | G06Q 20/20 705/17 |
| 2010/0019028 | A1 | 1/2010 | Books et al. | |
| 2010/0076877 | A1 | 3/2010 | Lenahan et al. | |
| 2010/0276484 | A1 * | 11/2010 | Banerjee | G06Q 30/06 235/379 |
| 2011/0015960 | A1 * | 1/2011 | Martin | G06Q 10/105 705/320 |
| 2011/0040682 | A1 * | 2/2011 | Vasten | G06Q 20/40 705/41 |
| 2011/0264503 | A1 | 10/2011 | Lenahan et al. | |
| 2012/0233074 | A1 | 9/2012 | Dangott et al. | |
| 2014/0304147 | A1 * | 10/2014 | Wolff | G06Q 30/02 705/39 |
| 2016/0034875 | A1 | 2/2016 | Stevens et al. | |
| 2016/0048929 | A1 * | 2/2016 | Parento | G06Q 20/0855 705/32 |
| 2016/0140520 | A1 * | 5/2016 | Antoo | G06Q 20/10 705/44 |
| 2017/0300894 | A1 * | 10/2017 | Shanmugam | G06Q 20/24 |
| 2017/0300907 | A1 * | 10/2017 | Shanmugam | G06Q 20/3255 |
| 2017/0364918 | A1 | 12/2017 | Malhotra et al. | |
| 2021/0224816 | A1 * | 7/2021 | Moore | G06Q 20/10 |

OTHER PUBLICATIONS

Nagele-Piazza, Lisa. “Thinking About Using Payroll Debit Cards? Read This First”. Retrieved from . Feb. 2018. (Year: 2018).

* cited by examiner

SYSTEMS AND METHODS FOR EMPLOYER DIRECT ELECTRONIC PAYMENT

CROSS-REFERENCE TO RELATED APPLICATION(S)

This patent application is a continuation of and claims the benefit of priority to U.S. application Ser. No. 17/333,871, filed on May 28, 2021, which is a continuation of U.S. application Ser. No. 15/856,737, filed on Dec. 28, 2017, now U.S. Pat. No. 11,055,678, the entireties of which are incorporated herein by reference.

TECHNICAL FIELD

The present disclosure relates to the field of employer payroll and consumer employee payment transactions and, more particularly, to establishing a secure bank-less payment transaction system for employer direct electronic payments.

BACKGROUND

In the modern financial system, consumers often use a payment vehicle, such as a debit or a credit payment card, to complete a transaction with a merchant, whether in person, by telephone, or online, etc. The payment vehicle used by the consumer is usually issued by financial institutions (e.g., banks) where the consumer keeps his/her funds in a savings or checking account, or by credit issuing companies that bill the consumer on a monthly basis.

In a typical scenario, an employee receives a wage or salary from an employer in the form of a check or other negotiable tender, which the employee deposits at a financial institution (e.g. banks). Alternatively, the employer may directly deposit the earnings of the employee at the financial institution. The direct deposit from the employer to a financial institution is generally performed using ACH transfer, which can take up to several days. In the traditional setting, the employee does not have access to his/her earnings instantaneously once he/she receives the wages or salary in the form of check or direct deposit in the bank. Accordingly, there is a need for systems and methods for enabling employees to settle and pay merchants using funds associated with and paid via their salaries, directly through funds earned from their employers without requiring the employees to engage with a bank at which those funds have already been deposited and cleared. Additionally there is the possibility for advanced funds to be issued by the employer to be used by the employee prior to the pay period ending without having to apply for a loan.

SUMMARY

According to certain aspects of the present disclosure, systems and methods are disclosed for an employer direct electronic payment system.

In one embodiment, a computer-implemented method is disclosed for establishing a bank-less payment system for employers to issue direct electronic payments to employees. The method includes: registering at least one employer at an employer database, receiving information about at least one employee of the employer from the database, registering at least one employee of the employer; generating at least one of a token and/or an account identification for at least one registered employee, issuing a credit or deposit account to at least one registered employee, and issuing an employee payment card and/or token to the registered employee identifying at least one registered employee and employer.

In the above embodiment, a computer-implemented method is disclosed for conducting a payment transaction by an employee using the employer payment system. The method includes: retrieving at least one of a token and an account identification from an employee payment card or wallet presented by a consumer, sending an authorization request with at least one of a token and an account identification, identifying an employer and an employee associated with the at least one of the token, account identification, and transaction information, determining whether the employee is authorized for the requested transaction based on an employee identification received from the employer's database, receiving an authorization for the transaction upon determining that the employee is authorized for the requested transaction, and upon receiving an approval authorization for the transaction, sending, to the employee deposit or credit account, a transaction request from the point of sale terminal.

In accordance with the above illustrated embodiment, the method for conducting a payment transaction by an employee using an employer payment system further involves transferring funds electronically from the employee's deposit account to the merchant in accordance with the transaction request between the merchant and the employee upon receiving the transaction request from the point of sale terminal; and updating the employer's database with the transaction information once the transfer of funds is completed and/or settled.

In one embodiment, a system is disclosed for conducting a payment transaction by an employee using an employer payment system. The system comprises: a memory having processor-readable instructions stored therein; and an acquirer processor configured to access the memory and execute the processor-readable instructions, which when executed by the acquirer processor configures the acquirer processor to perform a plurality of functions, including functions to: register at least one employer at an employer database; receive information about at least one employee of the employer from the database; register at least one employee of at least one employer; generate a token or account identification for at least one registered employee; and issue an employee payment card to at least one employee identifying at least one registered employee and employer.

In accordance with the above embodiment, the acquirer processor further performs functions to: identify an employer and an employee associated with the token or account identification; determine whether the employee is authorized for the requested transaction based on an employee identification from the employer's database; send the authorization for the transaction to the point of sale terminal that the employee is authorized for the requested transaction; and upon receiving an approval authorization for the transaction, send, to the employee deposit account or credit account, a transaction request from the point of sale terminal.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the detailed embodiments, as claimed.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

Figure 1:
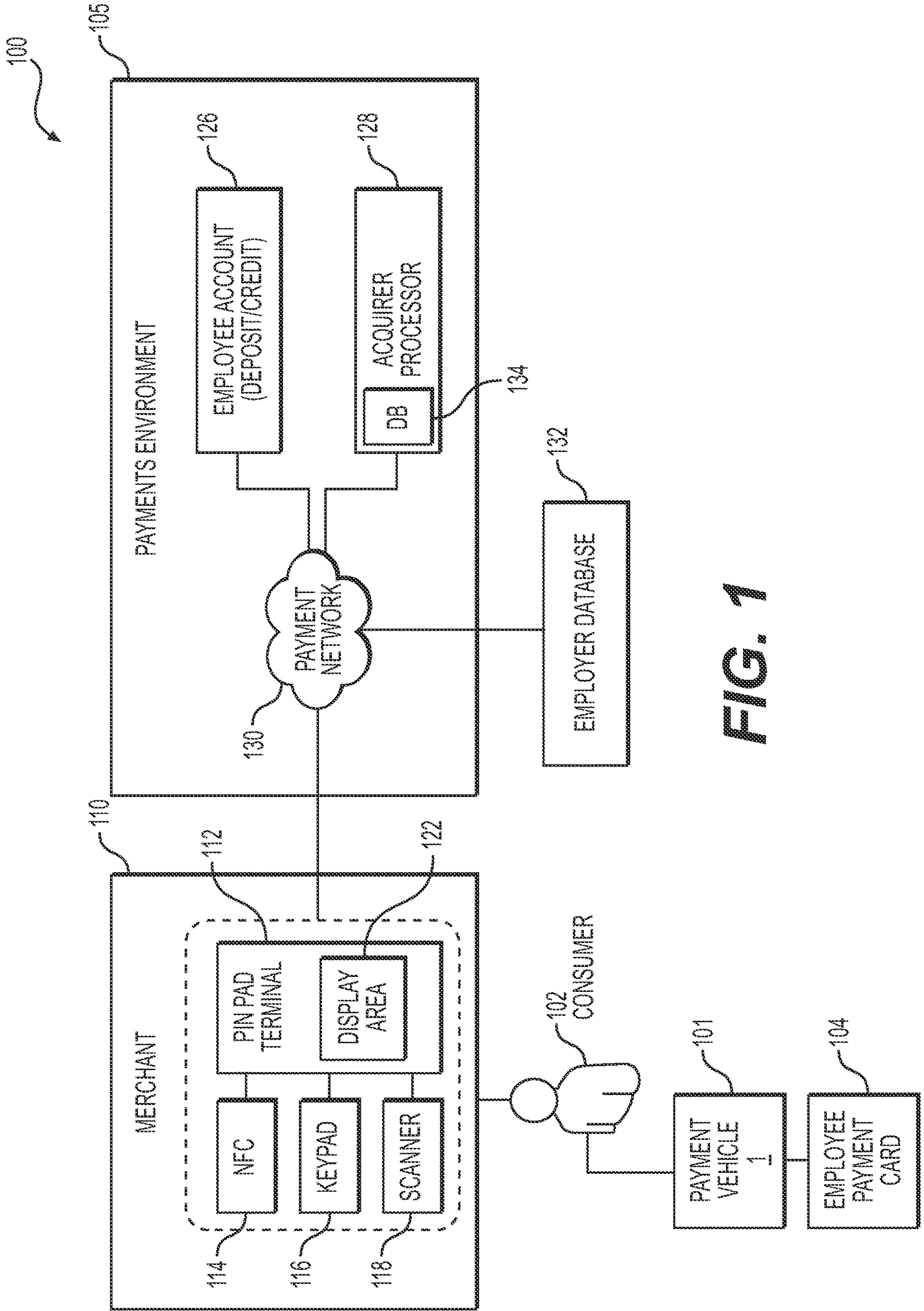
FIG. 1 depicts a merchant environment for processing employee consumer payment transactions directly from electronic employer payments, according to one or more embodiments.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Various non-limiting embodiments of the present disclosure will now be described to provide an overall understanding of the principles of the structure, function, and use of systems and methods disclosed herein for an employer payment system.

As described above, in typical scenarios, most employees do not have immediate access to their wages or salary when the wages or salary are directly deposited to the employee's savings or checking account. Additionally they may be limited by the bank account or credit account that they are using on daily usage. The employer payment system disclosed herein enables employees to directly access their earnings in order to complete a payment transaction using an employee payment card issued by the employee's employer or an intermediary financial institution. The disclosed employer payment system enables the employer to offer special services to employees, and generate additional benefits from maintaining and making the employee's wages or salary available to the employee on-demand, e.g., immediately. Examples of these services include the capability for pre-payday loans or purchases that are then withdrawn on payday or additionally set up as a loan with regular payment plans without the individual going through financial approval process. The employer could offer up automatic bill payment services, investment services, and reporting/dashboard services. The employer could offer its own rewards program or loyalty program to the employee that could have very unique rewards tied to their employment or work place. Accordingly, the embodiments of the present disclosure are directed to systems and methods for an employer payment system that enables employees to initiate and complete payment transactions at a merchant using an employer payment card.

One or more examples of these non-limiting embodiments are illustrated in the selected examples disclosed and described in detail with reference to FIGS. 1-4 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Embodiments described below may further provide detail about the employer direct payment system.

Turning to FIG. 1, in a typical scenario, a merchant environment 100 for processing consumer payment transactions, according to one or more embodiments, may include a merchant 110, an acquirer processor 128, a financial institution, and a consumer 102, which may be provided in communication with each other via a payment network 130. The components of the payments processing network may be connected by any combination of wired or wireless networks, for example, PSTNs and/or the Internet. Acquirer processor 128 (e.g., acquiring bank) may be in partnership or communication with payment network 130, such that the acquirer processor 128 may process payments through, and on behalf of, payment network 130. Payment network 130 may in turn have a partnership with a financial institution (e.g., issuing bank). The financial institution may hold accounts for one or more consumers 102. Consumer 102 may have a payment vehicle 101 (e.g., credit card, debit card, stored value card, etc.) which may be affiliated with payment network 130. Consumer 102 may be able to use their payment vehicle 101 to make purchases with merchant 110.

Typically, acquirer processor 128 may be an entity that provides a variety of electronic payment processing services to merchant 110. For example, acquirer processor 128 may be an entity that receives payment information from a transaction that occurs at a pin pad terminal 112 of merchant 110. The payment information may be, for example, payment card information encoded in the magnetic stripe, electronic wallets, or EMV chip of payment vehicle 101 and a payment amount of a transaction being made by, for example, consumer 102 with merchant 110 using the payment card account associated with payment vehicle 101.

In general, consumers use a "payment vehicle" 101 or a "payment card" issued by financial institutions (e.g. banks) for in-store or online purchases with merchants. The "employee payment card" 104 is a payment card that is similar to traditional payment vehicles but specific to an employer. For simplicity, the description that follows will be provided by reference to a "payment vehicle" or an "employee payment card," which generally refers to any type of alternative to currency. Therefore, it is intended that the following description encompasses the use of the present disclosure with many other forms of financial alternatives to currency, including credit cards, debit cards, and prepaid cards specific to the employer.

The employee payment card 104 may include traditional plastic transaction cards, titanium-containing, or other metal-containing, transaction cards, clear and/or translucent transaction cards, foldable or otherwise unconventionally sized transaction cards, radio-frequency enabled transaction cards, or other types of transaction cards, such as credit, charge, debit, prepaid or stored-value cards, electronic benefit transfer cards, electronic cards within a security module such as electronic wallets, or any other like financial transaction instrument. Merchants 110 use payment platforms, such as Point of Sale ("POS") terminals and POS systems, to accept payments from consumers in the form of employee payment cards. These payment platforms are either used for an online purchase or in-store purchase.

In one or more embodiments, the acquirer processor 128 is modified for the employee payment system, so as to register an employer, receive information about employee(s) from the employer's database, and register employee(s). The acquirer processor 128 further generates tokens or account identifications for the registered employee(s) and issues employee payment cards to the employee(s) identifying the employer and employee(s). The acquirer processor 128 stores the employee and employer identifications associated with the generated tokens and/or account identifications in an acquirer database 134.

Merchant 110 may be a merchant offering goods and/or services for sale to consumer 102 who have contracted with acquirer processor 128. Merchant 110 may be equipped with POS device 110, which is configured to receive payment information from payment vehicle 101 (e.g. employee payment card) and to relay received payment information to acquirer processor 128. Merchant 110 can be any type of merchant, such as a brick-and-mortar retail location or an e-commerce/web-based merchant with a POS device 110 or a web payment interface.

In FIG. 1, consumer 102 is shown to be associated with a payment vehicle 101. As is to be appreciated, payment vehicle 101 can include any type of payment vehicle that can be utilized to initiate a payment transaction. Unless otherwise specified herein, "payment vehicle" includes a virtual card, such as a display or screenshot for a mobile phone or for another portable device (e.g., a flash drive, smart chip, a laptop or portable computer), or for a computer device (e.g., a desktop computer) in combination with data indicative of a token, account identification, or other account information indicative of an employee. Additionally, the token, account identification, or account indicative information further identifies the employer associated with the account. Data associated with the cards may include an encrypted or unencrypted account identification or other encrypted or unencrypted account indicative information and/or encrypted or unencrypted information associated with a particular card, issuer, creator, or group of merchants. It is also contemplated that the card may have multiple embodiments or forms. For example, the card may be a physical card (e.g., in the form of a magnetic striped plastic card), a virtual card (e.g., in the form of a display on a smart phone), or both. In embodiments in which the card is a virtual card, the corresponding account information (e.g., account identification) would initially be provided to the consumer and the consumer would communicate the account information to the merchant. The virtual card may be communicated by displaying a display or screenshot, and/or by transmitting a signal, such as by using a near field communication (NFC) technology, or other secure transport technologies to complete the transaction with the selected merchant. NFC is a short range, high frequency, wireless communication technology that enables the exchange of data between devices over a relatively short distance. Optionally, the virtual card may have a display element (e.g., a barcode or string of numbers) which identifies the account identification associated with the card. Alternatively, the virtual card may have display elements relating to the merchants that accept the card. Thus, in one or more embodiments, whether the employment payment card 104 is physical or virtual, the card may communicate account information. Moreover, the card is issued by acquirer processor specific to the employer.

Consumer 102 may be an individual who is an employee at the issuer employer or another individual related to or affiliated with the employee or employer. Each consumer 102 may generally have at least one payment vehicle 101 associated with each payment account held by the employee. A POS device 110 of merchant 110 may provide transaction information including a token or account identification to the payment network 130 using any desired payment transaction communications. When consumer 102 checks-out, or pays for the goods or services, the identifying indicia of consumer 102 may be used for authentication. In one or more embodiments, pin pad terminal 112 may include an NFC system 114. NFC system 114 may communicate wirelessly with payment vehicle 101 of consumer 102, for example to obtain an authorization code or employee and employer identifying information of consumer 102 or of payment vehicle 101. In one or more embodiments, pin pad terminal 112 may include a keypad 116. Consumer 102 may enter a personal identification number on keypad 116 for making a payment. Other numbers or alphanumeric characters, such as temporary passwords or authorization codes, are also contemplated as would be understood by one of ordinary skill in the art. In one or more embodiments, pin pad terminal 112 may include a scanner 218. Consumer 102 may display a code, such as, for example, a barcode or quick response (QR) code, etc., on the display of their mobile computing device to provide identifying indicia of consumer 102. Scanner 218 may be, for example, a handheld scanner, an embedded scanner, such as one similar to that used to scan items at grocery stores, a camera, and so forth as would be understood by one of ordinary skill in the art.

Pin pad terminal 112 may include a display area 122. In one or more embodiments the display area 122 may be, for example, a window, a widget, or a pop-up, a webpage, and so forth, and be rectangular or nonrectangular, and occupy one or multiple contiguous or non-contiguous areas of pin pad terminal 112.

In an example embodiment, payment network 130 may be partnered or affiliated with acquirer processor 128, which may manage payment transactions associated with payment network 130. In one or more embodiment, payment network 130 may be, for example, a network that relays employee payment cards to and from various employee account(s), with enrolled employers, and with various types of employer and employee accounts at financial institutions.

In one or more embodiment of present disclosure, acquirer processor 128 manages payment accounts associated with one or more payment networks 130 on behalf of one or more consumers 102. Alternatively, employer-issued deposit or credit accounts associated with one or more payment networks 130 are managed by the employer and the employees. Employers may issue credit to at least one employee according to their wages or salary and allow the employee to pay down the balance periodically.

FIG. 1 further depicts a payment environment 105 in which the acquirer processor 128 interacts with the employee's account 126 and employer database 132 to process an electronic payment directly through a respective enrolled employer of the employee. The employee's account 126 may be a deposit account in which the employee may deposit his/her earnings. In an alternative embodiment, the employee's account reflects credit allotted to the employee by the employer or an intermediary financial institution according to various factors such as the employee's salary, wages, tenure, credit, savings, etc.

Figure 2:
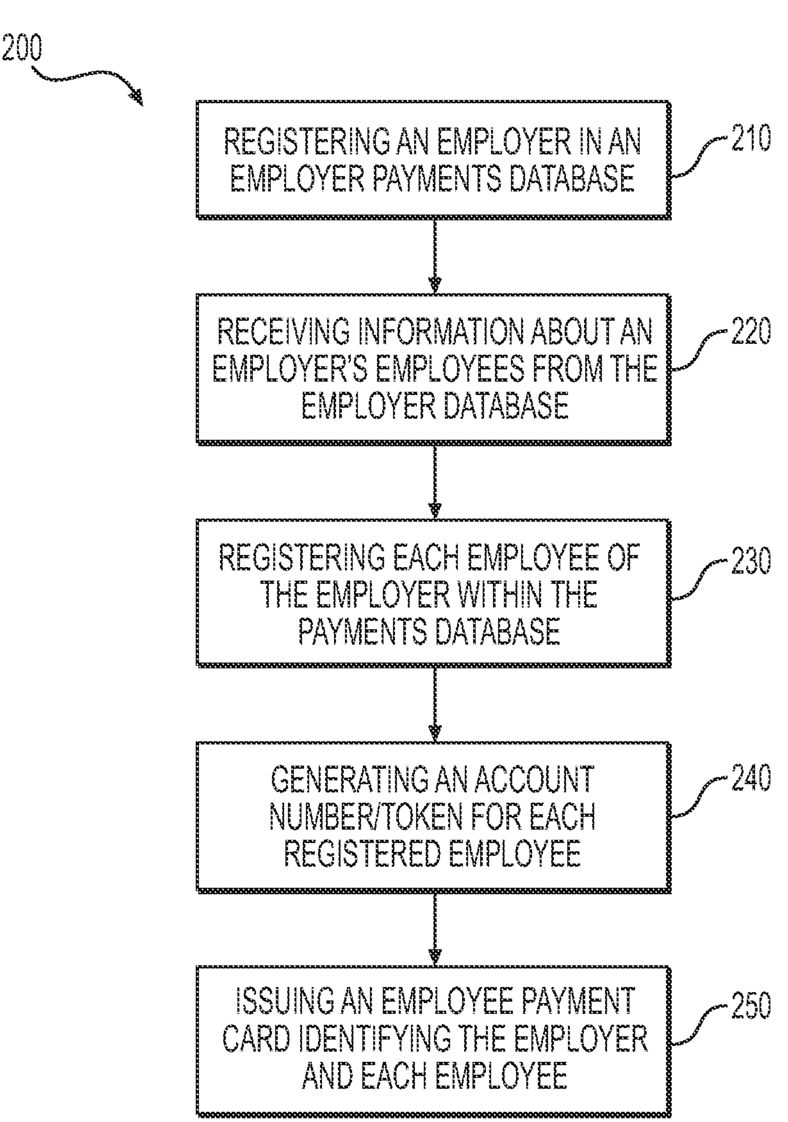
FIG. 2 is a flow chart depicting an example process for issuing an employee payment card to the registered employee.

FIG. 2 is a flow chart depicting an example process for establishing the employer payment system. The acquirer processor 128 may be configured to register at least one employer in an employer database as shown operation 210. Once the employer is registered, according to operation 220, the acquirer processor 128 may receive information about at least one employee of the employer from at least one employer's database 132. Similarly, once the employee information is provided, the acquirer processor 128 may register at least one employee pertaining to the registered employer per operation 230. In an example embodiment, the acquirer processor 128 may further generate at least one of a token and an account identification for the registered employee per operation 240. In an exemplary embodiment, the acquirer processor 128 may issue a deposit account associated with the at least one token and account identification to at least one employee, where at least one employee may deposit his/her earnings. In an alternative embodiment, the acquirer processor 128 issues at least one employee a credit account associated with the token and/or account identification based on the at least one employee's pay information from the employer's database. Additionally, the acquirer processor 128 may issue an employee payment card to at least one registered employee for the deposit account and/or credit account, as shown in operation 250.

Figure 3:
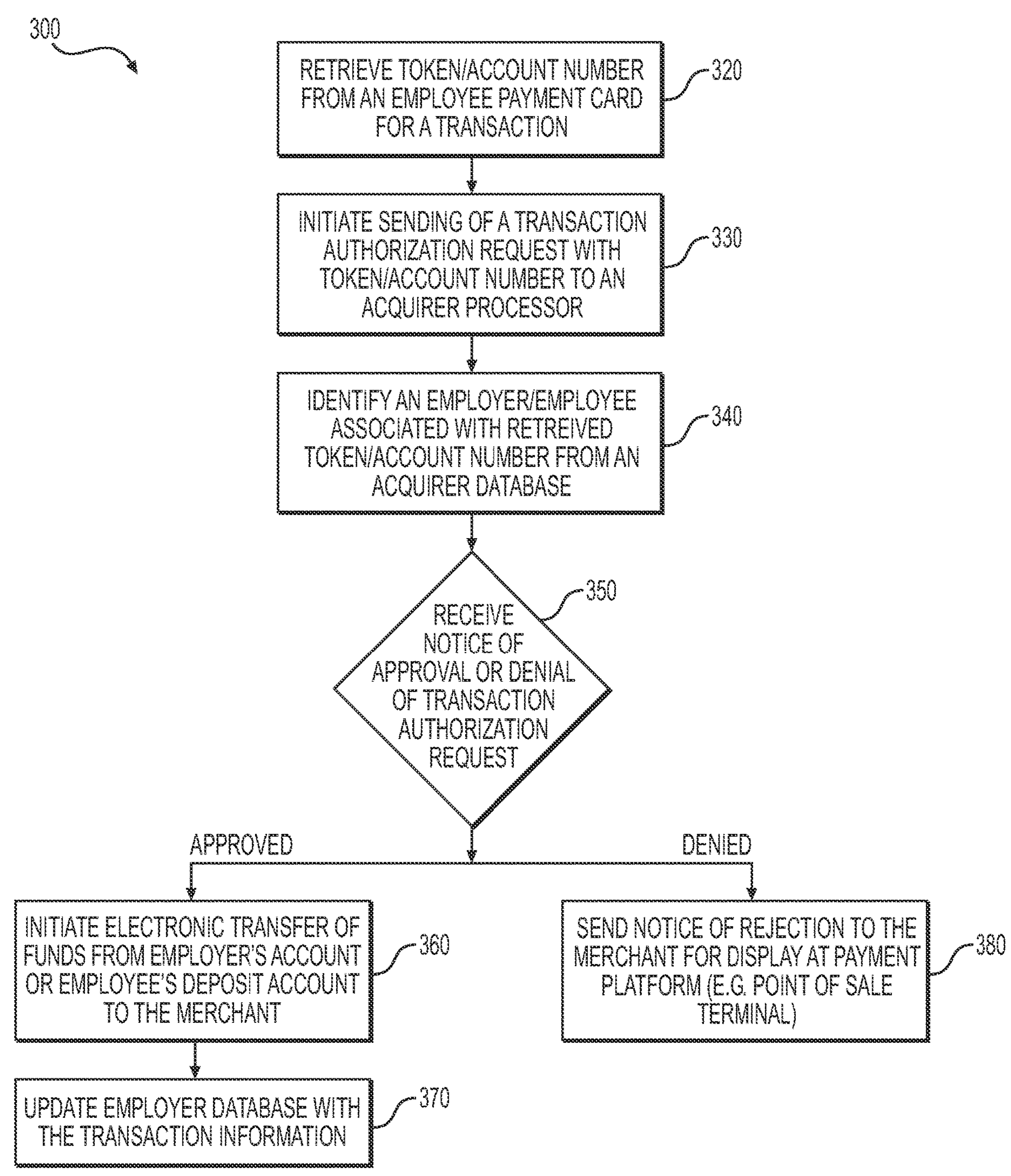
FIG. 3 is a flow chart depicting an example process for conducting payment transactions by a consumer using an employer payment system.

FIG. 3 is a flow chart depicting an example process for conducting a payment transaction using the employer payment system. A consumer presents an employee payment card at the merchant 110. The payment platform of the merchant, such as the point of sale terminal, retrieves at least one of the token and the account identification from the employee payment card used by the consumer at the merchant's payment platform for a transaction in operation 320. In an example embodiment, at operation 330, the retrieved token or account identification is sent to the acquirer processor 128 along with an authorization request through payment network 130. The acquirer processor 128 may identify the employer and the employee associated with at least one token or account identification provided by the payment platform in operation 340. The acquirer processor 128 may perform a query to an acquirer database 134 to identify the employer and employee associated with at least one token or account identification provided by the payment platform in operation 340.

At operation 350, the acquirer processor 128 may further determine whether the employee is authorized for the requested transaction based on employee information from the employer's database 132, wherein the employee information comprises at least one of the employee's payroll information, allotted credit, and available funds. Merchant's payment platform (e.g. point of sale terminal) 110, may receive, from the acquirer processor 128, the authorization for the transaction upon determining that the employee is authorized for the requested transaction. Upon receiving an approval authorization for the transaction, the merchant payment platform 110 may send a transaction request from the point of sale terminal to the employer or an affiliated acquirer processor or other financial institution.

In an example embodiment, upon receiving the transaction request from the point of sale terminal, the acquirer processor 128 may initiate transferring of the funds from the employee's deposit or credit account (e.g., payroll-based employee account with the employer) to the merchant in accordance with the transaction request between the merchant and the consumer as per operation 360. The acquirer processor 128 may further update the employer's database 132 with the transaction information once the transfer of the funds is completed in operation 370.

In an alternative embodiment, upon receiving the transaction request from the point of sale terminal, the merchant payment platform 110 may initiate transferring of funds electronically from an employer's funds account according to the credit allotted to the employee in accordance with the transaction request between the merchant 100 and the employee per operation 360. The acquirer processor 128 may further update the employer's database 132 with transaction data once the transfer of the funds has been completed per operation 370. The acquirer processor 128 may further settle the funds from the transaction between the employer and the employee at the time of the transaction or periodic basis depending on the type of purchases made. In an example embodiment, the transaction request is at least one of a purchase request, a bill pay request, and a cash withdrawal request. In an example embodiment, the employer may allow for the employee to build up a revolving credit balance and may periodically receive payments from the employee to pay down the balance.

In an alternate embodiment, pin pad terminal 112 may generate a transaction request for payment by merchant 110. The transaction request may include information such as, for example, information identifying the merchant to acquirer processor 128 or the party of payment network 130, the payment amount, which can include a gratuity, identifying indicia for consumer 102, authentication information such as whether the consumer was authenticated by merchant 110 using images of consumer 102, and/or authentication information such as personal identification number entered on keypad 116 by the consumer, a code scanned by scanner 118, or information about consumer 102 or payment vehicle received via NFC handshake or any other suitable authentication information.

In an example embodiment, upon determining that the authorization request cannot be authorized, acquirer processor 128 may send a transaction rejection message from the point of sale terminal to the merchant in operation 380. The point of sale terminal at the merchant 100 may inform the consumer that the transaction request was denied. Acquirer processor 128 may also receive information from payment network 130, such as confirmation or rejection of an attempted transaction using payment vehicle 101, and may convey that information to the appropriate POS terminal. Moreover, acquirer processor 128 may provide security and/or encryption services to merchant 110 and payment network 130, such that payments processed at pin pad terminal 112 may be completed with a decreased risk of data or financial theft or loss. Acquirer processor 128 may be located, for example, at a remote location from merchant 110 that uses its services, and may, for example, interact with merchant 110 primarily over an electronic network, such as a data network or the Internet.

The interactive graphical user interface may be presented to the employer to enable the registered employer to view the employee's transaction data. The interface may enable employers to analyze employees' transaction data and provide special services and items around their buying habits. Learning the spending habits of employees gives the employer an opportunity to create provide employees with further benefits, such as by providing buying-power based special offers, services and investments in the employees' funds. For example, the employer may contract with a specific vendor to provide services to employees with special offers after learning that most employees use the specific service.

The acquirer processor 128 may further present, via interactive graphical user interfaces (GUI), at least one of a deposit account, employer issued credit account, and employee's funds to at least one registered the employer enabling at least one registered employer to at least one of issue or change credit allotted to at least one employee, provide services, special offers around employee's salary, and invest employee's funds. For example, the employer's interface may enable employers to provide special services (e.g. banking services), such as automatically settling the funds when funds are available in an issued deposit account. The employer's interface further enables employers to invest the employee's funds to generate further revenue for employees. The employers interface may allow employers to present any promotional offerings for its products to employees with special offers by which employees can directly purchase discounted products and services. In an example embodiment, the acquirer processor 128 may further present an interactive graphical user interface to an employee for enabling employees to at least one of manage funds between employee deposit account and any external bank accounts, settle funds from a deposit account to a credit account, and purchase special discounted services and products provided by the employer.

In an example embodiment, in the event at least one employee changes employment, the acquirer processor 128 may associate at least one of a token and an account identification with a new employer's database and transfer at least one of the employer credit and deposit account associated with the previous employer to a new employer according to the terms and conditions established by the previous and the new employers. In one embodiment, the employee may use the same employee payment card after changing the employment.

In an another embodiment, if the employee separates from his/her employment, the acquirer processor 128 may cancel the employee payment card and transfer the employee's account to a financial institution according to the terms and conditions established by the employer and/or financial institution. In an alternate embodiment, the employee payment card may be automatically converted to a traditional credit card or debit card that uses the debit or credit account established at the financial institution in the event the employee wishes to transfer his/her funds and credit to at least one financial institution. In an alternative embodiment, the employee may transfer the funds directly to a Stored Value card that rides on the traditional credit card rails. In an alternative embodiment, the employee have the funds distributed as a check.

Figure 4:
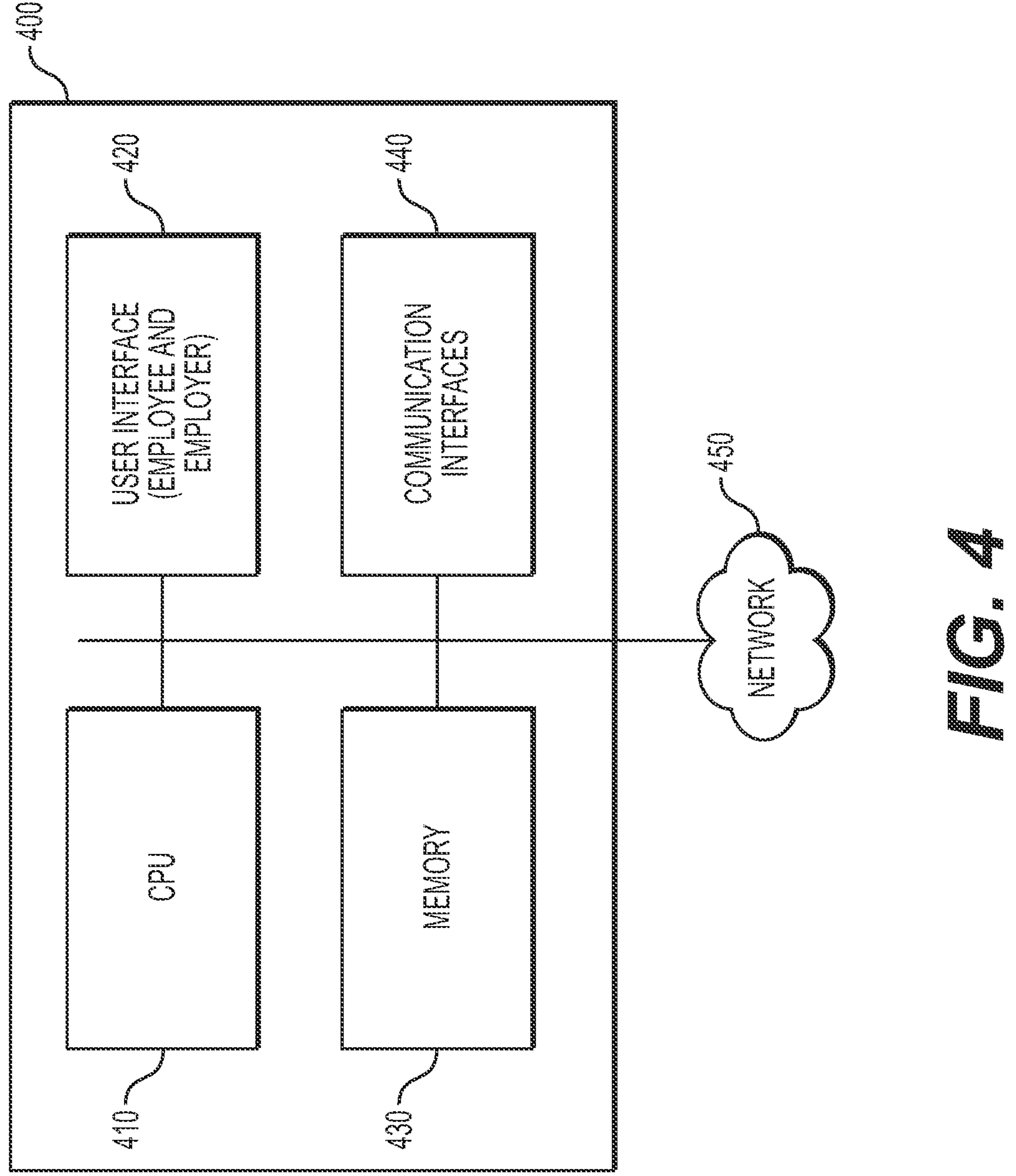
FIG. 4 depicts an example of a computing device relevant to the disclosed direct electronic employer payment systems.

The processes described above can be performed on or between one or more computing devices 400. Referring now to FIG. 4, an example computing device 400 is presented. A computing device 400 can be a server, a computing device that is integrated with other systems or subsystems, a mobile computing device, a cloud-based computing capability, and so forth. The computing device 400 can be any suitable computing device as would be understood in the art, including without limitation, a custom chip, an embedded processing device, a tablet computing device, a financial transaction services processor, a profiler computing system, a data aggregator computing system, a personal data assistant (PDA), a desktop, a laptop, a microcomputer, a minicomputer, a server, a mainframe, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

The computing device 400 includes a processor 410 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 400 also includes one or more memories 430, for example read only memory (ROM), random access memory (RAM), cache memory associated with the processor 410, or other memories such as dynamic RAM (DRAM), static RAM (SRAM), programmable ROM (PROM), electrically erasable PROM (EEPROM), flash memory, a removable memory card or disk, a solid state drive, and so forth. The computing device 400 also includes storage media such as a storage device that can be configured to have multiple modules, such as magnetic disk drives, floppy drives, tape drives, hard drives, optical drives and media, magneto-optical drives and media, compact disc drives, Compact Disc Read Only Memory (CDROM), Compact Disc Recordable (CD-R), Compact Disc Rewriteable (CD-RW), a suitable type of Digital Versatile Disc (DVD) or BluRay disc, and so forth. Storage media such as flash drives, solid state hard drives, redundant array of individual disks (RAID), virtual drives, networked drives and other memory means including storage media on the processor 410, or memories 430 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 440 can be configured to transmit to, or receive data from, other computing devices 400 across a network 450. The network and communication interfaces 440 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 440 can include wired data transmission links such as Ethernet and TCP/IP. The communication interfaces 440 can include wireless protocols for interfacing with private or public networks 450. For example, the network and communication interfaces 440 and protocols can include interfaces for communicating with private wireless networks such as a Wi-Fi network, one of the IEEE 802.11x family of networks, or another suitable wireless network. The network and communication interfaces 440 can include interfaces and protocols for communicating with public wireless networks 440, using for example wireless protocols used by cellular network providers, including Code Division Multiple Access (CDMA) and Global System for Mobile Communications (GSM). The computing device 400 can use network and communication interfaces 440 to communicate with hardware modules such as a database or data store, or one or more servers or other networked computing resources. Data can be encrypted or protected from unauthorized access.

In various configurations, the computing device 400 can include a system bus 416 for interconnecting the various components of the computing device 400, or the computing device 400 can be integrated into one or more chips such as programmable logic device or application specific integrated circuit (ASIC). The system bus 416 can include a memory controller, a local bus, or a peripheral bus for supporting input and output devices 504, and communication interfaces 440. Example input and output devices 504 include keyboards, keypads, gesture or graphical input devices, motion input devices, touchscreen interfaces, one or more displays, audio units, voice recognition units, vibratory devices, computer mice, and any other suitable user interface or device for receiving user inputs and/or outputting information.

The processor 410 and memory 430 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low level, object-oriented, visual, compiled, or interpreted programming language.

These and other embodiments of the systems and methods may be used as would be recognized by those skilled in the art. The above descriptions of various systems and methods are intended to illustrate specific examples and describe certain ways of making and using the systems disclosed and described here. These descriptions are neither intended to be nor should be taken as an exhaustive list of the possible ways in which these systems can be made and used. A number of modifications, including substitutions of systems between or among examples and variations among combinations can be made. Those modifications and variations should be apparent to those of ordinary skill in this area after having read this disclosure.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc., are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc., can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures, or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

It is intended that the specification and examples be considered as exemplary only, with a true scope and spirit of the invention being indicated by the following claims.

What is claimed is:

1. A method comprising:

registering, by an acquirer processor, an employer with an employer payment system hosted at the acquirer processor;

receiving, by the acquirer processor, information regarding an employee of the employer from a database;

registering, by the acquirer processor, the employee of the employer with the employer payment system;

generating, by the acquirer processor, a token and account identification of the employee registered with the employer payment system;

issuing, by the acquirer processor, an employee payment card to the employee registered with the employer payment system of the employer;

generating, by the acquirer processor, an interactive graphical user interface including user elements enabling the employer to modify a credit allotment associated with the employee through linking a deposit account, an employer-issued credit card account, or an employee funds account of the employer;

receiving, by the acquirer processor, an authorization request for a transaction between the employee and a merchant, wherein the authorization request includes the token; and initiating, by the acquirer processor, an electronic transfer of funds from an account with the employer to the merchant based on the authorization request and the modified credit allotment.

2. The method of claim 1, further comprising:

determining, by the acquirer processor, whether the employee is authorized for the transaction.

3. The method of claim 1, further comprising:

updating, by the acquirer processor, a database of the employer with transaction data based on a completion of the electronic transfer of funds.

4. The method of claim 1, further comprising:

generating, by the acquirer processor, account identification for the employee, wherein the authorization request includes the account identification.

5. The method of claim 1, wherein the account is a deposit account where the employee deposits earnings.

6. The method of claim 1, wherein the account is a credit account reflecting credit allotted to the employee by the employer.

7. The method of claim 6, wherein the employer allots the credit based on a salary of the employee.

8. A device comprising:

a memory configured to store instructions; and one or more processors configured to execute the instructions to perform operations comprising:

registering, by an acquirer processor, an employer with an employer payment system hosted at the acquirer processor;

receiving, by the acquirer processor, information regarding an employee of the employer from a database;

registering, by the acquirer processor, the employee of the employer with the employer payment system;

generating, by the acquirer processor, a token and account identification of the employee registered with the employer payment system;

issuing, by the acquirer processor, an employee payment card to the employee registered with the employer payment system of the employer;

generating, by the acquirer processor, an interactive graphical user interface including user elements enabling the employer to modify a credit allotment associated with the employee through linking a deposit account, an employer-issued credit card account, or an employee funds account of the employer;

receiving, by the acquirer processor, an authorization request for a transaction between the employee and a merchant, wherein the authorization request includes the token; and initiating, by the acquirer processor, an electronic transfer of funds from an account with the employer to the merchant based on the authorization request and the modified credit allotment.

9. The device of claim 8, wherein the operations further comprise:

determining, by the acquirer processor, whether the employee is authorized for the transaction.

10. The device of claim 8, wherein the operations further comprise:

updating, by the acquirer processor, a database of the employer with transaction data based on a completion of the electronic transfer of funds.

11. The device of claim 8, wherein the operations further comprise:

generating, by the acquirer processor, account identification for the employee, wherein the authorization request includes the account identification.

12. The device of claim 8, wherein the account is a deposit account where the employee deposits earnings.

13. The device of claim 8, wherein the account is a credit account reflecting credit allotted to the employee by the employer.

14. The device of claim 13, wherein the employer allots the credit based on a salary of the employee.

15. A non-transitory computer-readable medium storing instructions that, when executed by one or more processors, cause the one or more processors to perform operations comprising:

registering, by an acquirer processor, an employer with an employer payment system hosted at the acquirer processor;

receiving, by the acquirer processor, information regarding an employee of the employer from a database;

registering, by the acquirer processor, the employee of the employer with the employer payment system;

generating, by the acquirer processor, a token and account identification of the employee registered with the employer payment system;

issuing, by the acquirer processor, an employee payment card to the employee registered with the employer payment system of the employer;

generating, by the acquirer processor, an interactive graphical user interface including user elements enabling the employer to modify a credit allotment associated with the employee through linking a deposit account, an employer-issued credit card account, or an employee funds account of the employer;

receiving, by the acquirer processor, an authorization request for a transaction between the employee and a merchant, wherein the authorization request includes the token; and initiating, by the acquirer processor, an electronic transfer of funds from an account with the employer to the merchant based on the authorization request and the modified credit allotment.

16. The non-transitory computer-readable medium of claim 15, wherein the operations further comprise:

determining, by the acquirer processor, whether the employee is authorized for the transaction.

17. The non-transitory computer-readable medium of claim 15, wherein the operations further comprise:

updating, by the acquirer processor, a database of the employer with transaction data based on a completion of the electronic transfer of funds.

18. The non-transitory computer-readable medium of claim 15, wherein the operations further comprise:

generating, by the acquirer processor, account identification for the employee, wherein the authorization request includes the account identification.

19. The non-transitory computer-readable medium of claim 15, wherein the account is a deposit account where the employee deposits earnings.

20. The non-transitory computer-readable medium of claim 15, wherein the account is a credit account reflecting credit allotted to the employee by the employer.

* * * * *